US005175809A

United States Patent [19]

Wobermin et al.

[11] Patent Number: 5,175,809

[45] Date of Patent: Dec. 29, 1992

[54] PIPELINE ARCHITECTURE FOR GENERATING VIDEO SIGNAL

[75] Inventors: James A. Wobermin, Arvada; Hon K. Wong, Golden, both of Colo.

[73] Assignee: Ampex Corporation

[21] Appl. No.: 497,957

[22] Filed: Mar. 22, 1990

Related U.S. Application Data

[63] Continuation-in-part of Ser. No. 411,076, Sep. 22, 1989, abandoned.

[51] Int. Cl.[5] .......................................... G06F 15/62

[52] U.S. Cl. .................................................. 395/141

[58] Field of Search ................ 364/518, 521; 395/133, 395/134, 141, 131

[56] References Cited

U.S. PATENT DOCUMENTS

| | | | |
|---|---|---|---|
| 4,364,037 | 12/1982 | Walker | 340/744 |
| 4,831,557 | 5/1989 | Murata | 395/129 |
| 4,972,330 | 11/1990 | Matsushiro et al. | 364/521 |

FOREIGN PATENT DOCUMENTS

| | | |
|---|---|---|
| 3243574A1 | 11/1982 | Fed. Rep. of Germany . |
| 2408262 | 11/1978 | France . |
| 2191666 | 6/1986 | United Kingdom . |

OTHER PUBLICATIONS

Dyer, Scott et al., "A Vectorized Scan-Line Z-Buffer Rendering Algorithm", IEEE CG & A, Jul., 1987.

Smith, Arthur et al., "A New Dimension in Broadcast Graphics", SMPTE Journal, Sep. 1982.

Weinstock, Neal, "CGI: An Introduction to the Technology", E-ITV, Apr., 1987.

IEEE Transactions on Computers, vol. 1, Jan. 1981, "The Edge Flag Algorithm-A Fill Method for Raster Scan Displays", Bryan D. Ackland.

*Primary Examiner*—Gary V. Harkcom
*Assistant Examiner*—Mark K. Zimmerman
*Attorney, Agent, or Firm*—John S. Bell; Richard J. Roddy

[57] ABSTRACT

A symbol generator with pipeline architecture comprised of a series of processing stages that regenerate a complete video data signal for each display field. Any symbol in a display may be moved in real time and independently of any other symbol, because the display is regenerated for each and every field. The symbol generator includes a cpu microprocessor, vertical sorter, boundary generator, horizontal sorter, and color palette.

14 Claims, 10 Drawing Sheets

PIPELINE ARCHITECTURE FOR GENERATING VIDEO SIGNAL

CROSS REFERENCE TO RELATED APPLICATIONS

This application is a continuation-in-part of copending patent application Ser. No. 07/411,076 filed Sep. 22, 1989, now abandoned.

This application is also related (i) to pending application Ser. No. 07/585,779 filed Sep. 20, 1990 and (ii) to pending application Ser. No. 07/497,471 filed Mar. 22, 1990, which is a continuation-in-part of patent application Ser. No. 07/411,446 filed Sep. 22, 1989, now abandoned.

BACKGROUND OF THE INVENTION

This invention relates to special effects video devices such as character generators used in television studios and broadcast facilities to generate video signals that represent alpha numeric characters and other symbols to be presented in a television display. It is an object in design of symbol generators to be able to provide symbols that are more complex than simple letters and numbers, and to be able to change the positions and colors of symbols and otherwise manipulate symbols in a display to create special effects. To achieve these objectives a symbol generator must generate and modify video signal information or a video signal very quickly.

The popular design approach of current symbol generators utilizes frame buffers to manipulate symbols or update video signals. Frame buffers include separate storage locations for recording data pertaining to each separate display location of a television display screen or raster. The frame buffer design requires that a very large amount of data be processed to provide and update video signals. Frame buffer systems achieve animation by moving blocks of data representing portions of a video image to be modified, formulating vectors, and filling memory blocks of the frame buffers with desired display patterns. Complex electronics are required to identify the portion of a display to be modified and manipulate blocks within a frame buffer representing those portions of the image.

There have been prior efforts to design a pipeline system that would regenerate a complete video signal representing all portions of an image each field and thereby avoid the requirement of frame buffer systems to identify particular portions of a video signal or blocks of data to be modified from one field to the next. The prior efforts have included use of symbol boundaries to reduce the amount of data from that which must be processed in a frame buffer system. They have not been successful and have not resulted in a practical commercial product. The capabilities of both frame buffer and prior pipeline designs has been limited with respect to dynamic display characteristics, the speed at which video signal data is handled, the amount of data that is required to be processed, the extent of special effects that can be provided, symbol movement, and the avoidance of distortion in the output images.

SUMMARY OF THE INVENTION

The symbol generator of this invention is comprised of a pipeline series of processing stages that generate a video data signal by generating and providing address signals to a color palette or equivalent look up memory that has been pre-loaded with video signal data or RGB and key values that an operator desires to include in the video signal. The symbol generator as illustrated herein includes a cpu microprocessor that calculates boundary coordinates independent of position in a desired display and identifies boundary points as being along either the left edge or right edge of the area contained within the boundary. The cpu provides this information along with various operator selected control parameters to a staged signal processing circuit. The processing circuitry maintains the identification of left and right boundaries, and applies signals for individual left/right boundary points to generate a summed address signal that is provided to control output of the video data signals from the color palette. The summed address signal simplifies processing requirements of the pipeline system. The signal is formed by applying individual address signals for left boundaries to increase the value of the summed signal and individual address signals for right boundaries are applied to decrease the value of the summed signal.

The processing pipeline includes separate vertical sorter, boundary generator and horizontal sorting stages. These stages generate and sort address signals, for all boundaries in the video signal according to the positions of those boundaries for each field. The vertical sorter stage is configured to sort left and right points of a continuous boundary line that fall on the same horizontal scan line of a display raster as left/right boundary pairs. The horizontal sorting stage includes two address memories connected in series to control readout from a parameter memory and provide rapid horizontal sorting. In operation, individual bits in the first memory index memory locations or registers in the second memory, which in turn contain addresses sorted in appropriate horizontal order to registers in the parameter memory that contain data for different boundary points along a scan line. A boundary buffer memory is included in the pipeline to increase the capability of the overall system and permit processing of more complex images then could otherwise be handled. The boundary memory is a one field memory that collects the sorted boundary coordinates and fill parameters associated with each boundary for each video display field.

DETAILED DESCRIPTION

Figure 1:
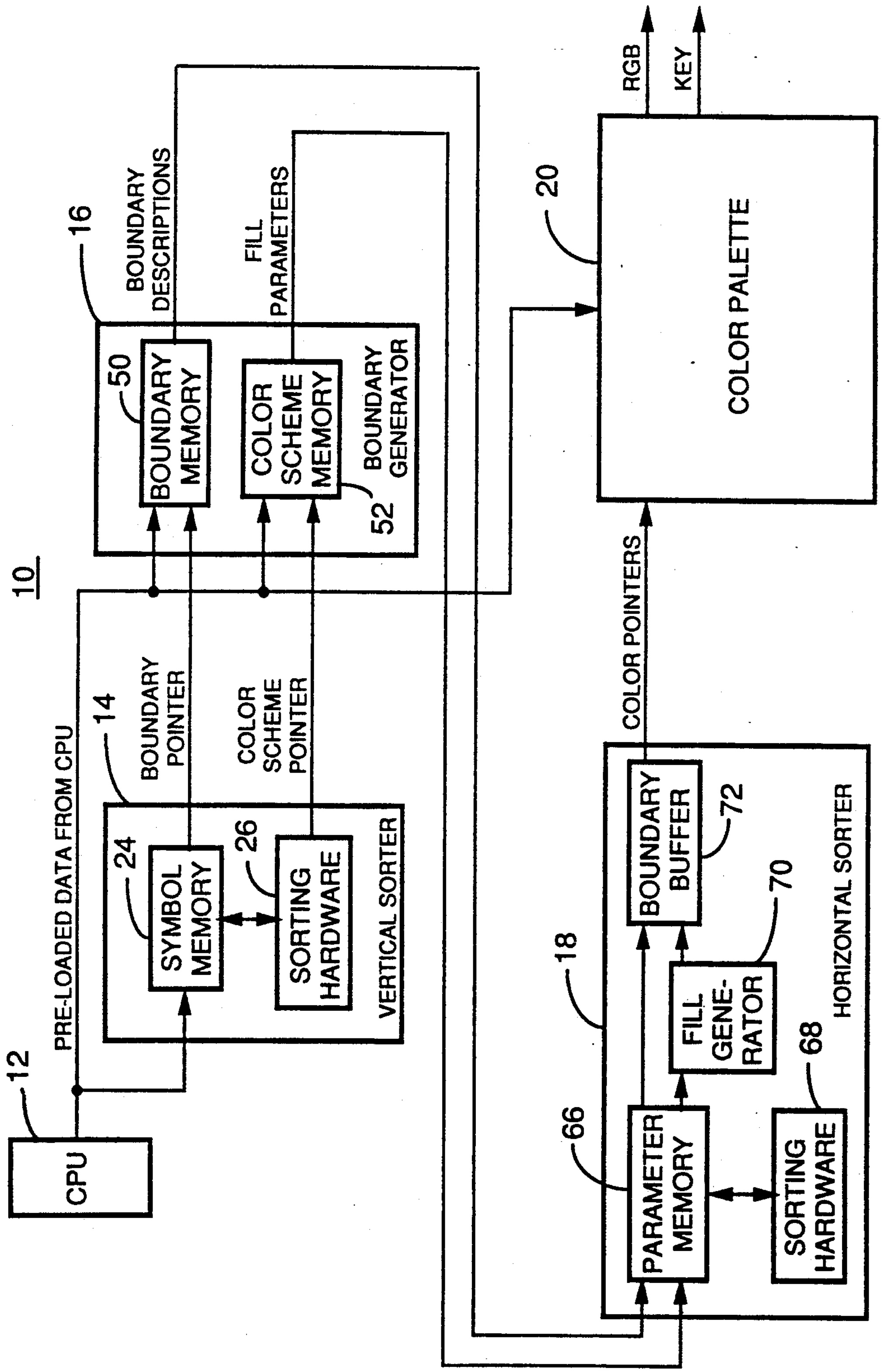
FIG. 1 is a block level diagram of a symbol generator that incorporates the pipeline architecture of this invention.

FIG. 1 illustrates a symbol generator 10 for providing a video signal representing symbols selected by operator arranged in desired positions in an output display. Generator 10 is comprised of a cpu 12 for generating the line segments or coordinate points of the boundaries of selected symbols, a vertical sorter 14 for sorting symbols according to y axis or scan line position in a display, a boundary generator 16 for providing the display coordinates or positions in a desired display of the boundary coordinate points calculated by the cpu, a horizontal sorter 18 for sorting boundary coordinates in horizontal or order along scan lines of a display, and a color palette 20 for providing a video output signal representing the desired display.

CPU—Calculation of Symbol Coordinates

Figure 10:
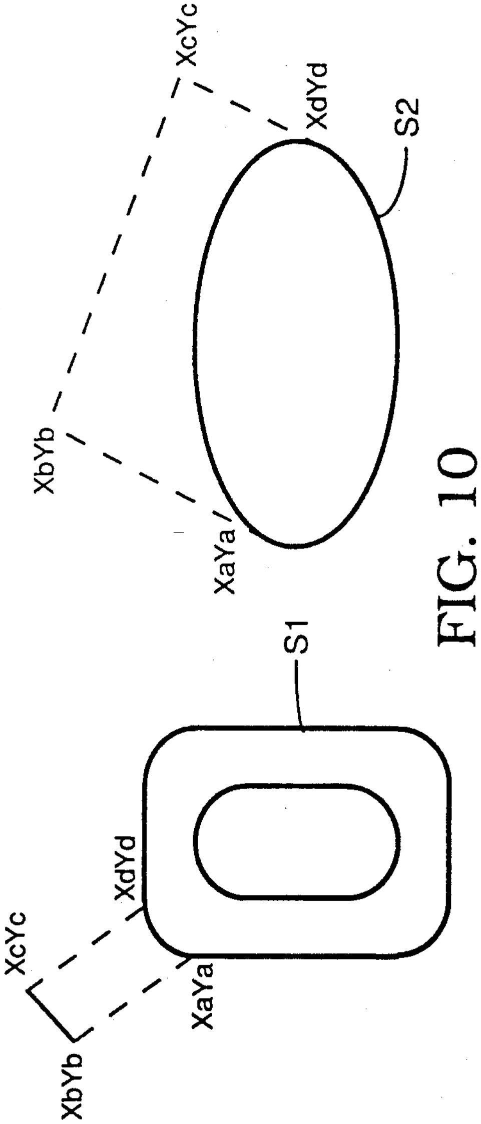
FIGS. 10 and 11 illustrate initial calculation of the boundaries of the symbols shown in FIG. 2.
Figure 11:
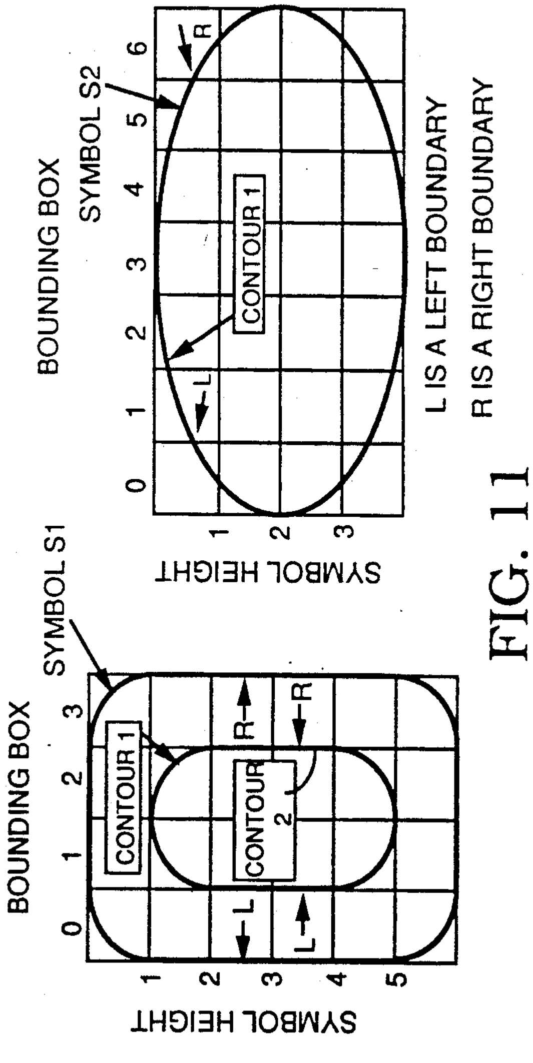

The cpu is comprised of a general purpose microprocessor programmed to calculate the coordinates of the line segments or points that comprise the boundaries of selected symbols from equations that describe the shape of those boundaries. For letters and numbers, the coordinates are generally called font coordinates and the equations are called typeface equations. Examples of such equations include Bezier curve equations, conic curve equations and linear or line equations (vectors). FIGS. 10 and 11 illustrate calculation of boundary coordinates of two symbols S1 and S2 using Bezier equations. Specific curves or boundaries are determined by a set of 4 control points, two of which identify the start and end points of the curve, and 2 control points that characterize the curve between those end points. The coordinates of points along a curve or boundary are calculated by setting these control points to appropriate values and varying the parametert in the following Bezier equations between 0 for the start point and 1 for the end point.

$$X = x_a(1-t)^3 + 3x_b(1-t)^2t + 3x_ct^2(1-t) + x_dt^3$$

$$Y = y_a(1-t)^3 + 3y_b(1-t)^2t + 3y_ct^2(1-t) + y_dt^3$$

where:

$(x_a, y_a)$ = start point of the curve $(x_b, y_b)$, $(x_c, y_c)$ = control points $(x_d, y_d)$ = end point of the curve $0 \leq t \leq 1$ The line segments or boundary coordinates calculated by the CPU are specific to each symbol and independent of the intended location of the symbol in a display. These calculated coordinates are referred to herein as bounding box coordinates. The resolution of the bounding box coordinate system in which coordinate values are calculated corresponds to the resolution of a television display. The x integers define width in units corresponding to the spacing between the discrete display locations disposed along the parallel lines of a television display raster. The y integers define height in units that correspond to the spacing between scan lines of a display. FIG. 11 shows bounding box coordinates in exaggerated proportion for illustration. Each square represents an individual picture element or pixel of a display. The term pixel is used in this application to refer to the discrete display locations of a television display screen or raster. In appropriate context the term also refers to the portion or section of a video color signal representing the output to be provided from a raster point or display location.

CPU—Classification and Sorting

In addition to calculating coordinates, the cpu also classifies and sorts boundary coordinates according to pre-programmed logic. With respect to classification the cpu assigns a reference number to each boundary line of a symbol. This number applies to the complete line or outline defined by the line and is therefore referred to herein as a contour number. Symbol S1 shown in FIG. 11 includes two closed contour lines which are given contour numbers 1 and 2. The boundary or contour numbers are specific to each symbol. Symbol S2 is defined by one closed contour boundary line. This contour is assigned a contour number of 1. The contour number is used together with an operator selected color scheme number for each symbol to generate color address numbers which determine the color value of the video signal provided by the color palette 20 for the portions of the symbols or area within each boundary.

Figure 12:
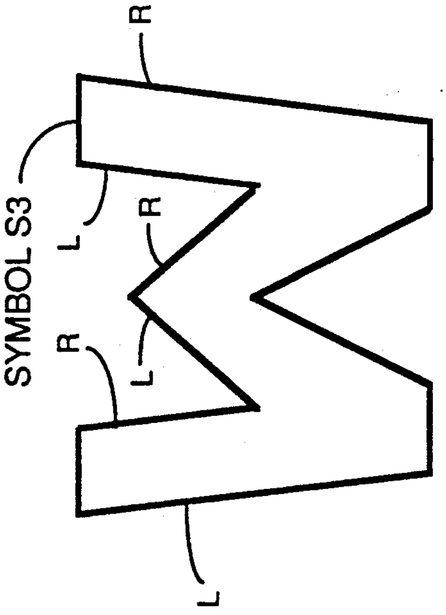
FIG. 12 illustrates symbol contour having multiple left and right boundaries.

The cpu identifies sections or coordinates of each boundary as being either right or left, or in other words defining either a right or left edge of the area contained within the boundary. Edges are determined to be either left or right by reading the x coordinate value for each scan line. As shown by the "W" shaped symbol S3 in FIG. 12, one boundary line or contour may have several different right sections and left sections. The left most boundary point along a scan line is a left boundary, the next a right, the next a left, and so forth. The sides or edges of each closed contour boundary are determined to be either left or right without regard to any other boundary in the symbol. For example, the opposite sides of the boundary contour 1 of Symbol S1 in FIG. 11 are defined as left or right in scanning along that boundary without regard to the presence of boundary contour 2 within the area defined by boundary 1. Left/right boundaries are collected into boundary pairs with each pair belonging to the same contour.

When a boundary is preselected to define an opening or hole in a symbol to be displayed so that the viewer will observe the background behind that portion of a symbol, the left/right designation of the sides or edges of the contour is reversed. The letter "O" is an example of this type symbol. If symbol S1 is to be a true letter "O" so that the background behind the "O" will be seen in contour area 2, the left side or edge (which is labeled left in FIG. 11) is designated right and the right side (labeled) is designated left for processing through the subsequent stages of the boundary generator 10. After the left/right designations are appropriately applied to hole cutting contours, boundary pairs for these contours are collected and processed through the system the same as all other contours.

The cpu also sorts the calculated line segments or coordinates for each symbol in vertical or y axis order. The sort is accomplished by reading the y coordinate values of each contour point of a symbol. This vertical sort is specific for each symbol, independent of any other symbol and does not reflect other factors such as the position in a display at which an operator may chose to place the symbol. The sort does mix the contours of each individual symbol that contains more than one contour. That is, all coordinate points of all contours of a symbol on one horizontal scan line are grouped together before listing points on the next line.

CPU—Operator Selection of Display Parameters

In response to operator selection, the cpu provides the location or x and y coordinates of a reference point for each symbol in a desired raster display. This reference point location for each symbol identifies the position of the upper left hand corner or location of the top left bounding box pixel in a television display. More specifically, since the symbol generator 10 does not include a device for presenting a video display to a viewer but instead generates a video data signal for use by a display device, the reference point location signal determines the position or portion of the video data signal provided by symbol generator 10 that represents that symbol. The terms left and right are used herein according to standard convention in video technology with display raster scanning beginning at the upper left hand corner of a display screen and scanning from left to right across the screen along horizontal lines in sequence from the top to bottom. The value of the reference point is not restricted and may correspond to any point on a display raster either aligned with a pixel, or part way across or between pixels in either the x or y directions.

The cpu also provides an operator selected color scheme number for each symbol that is added to the contour numbers to provide color pointers or address numbers that determine the color value of the video signal to be provided by the symbol generator 10, and a number referred to hereinafter as symbol name that identifies an initial memory location or starting point in boundary generator 16 containing symbol parameters for that symbol. In a operation, the reference point location number determines the position in the output video data signal provided by the symbol generator 10 of signal information for that symbol, and thus the location of the symbol in an output display when the data signal is applied to a display device. The reference number is changed to move a symbol or cause a symbol to be in a different position in a subsequent frame. The color scheme number is varied to change the color of a symbol. The symbol name number is used in the vertical sorter 14 as described hereinafter to locate symbol parameters for each scan line during vertical sorting.

Vertical Sorter

Figure 3:
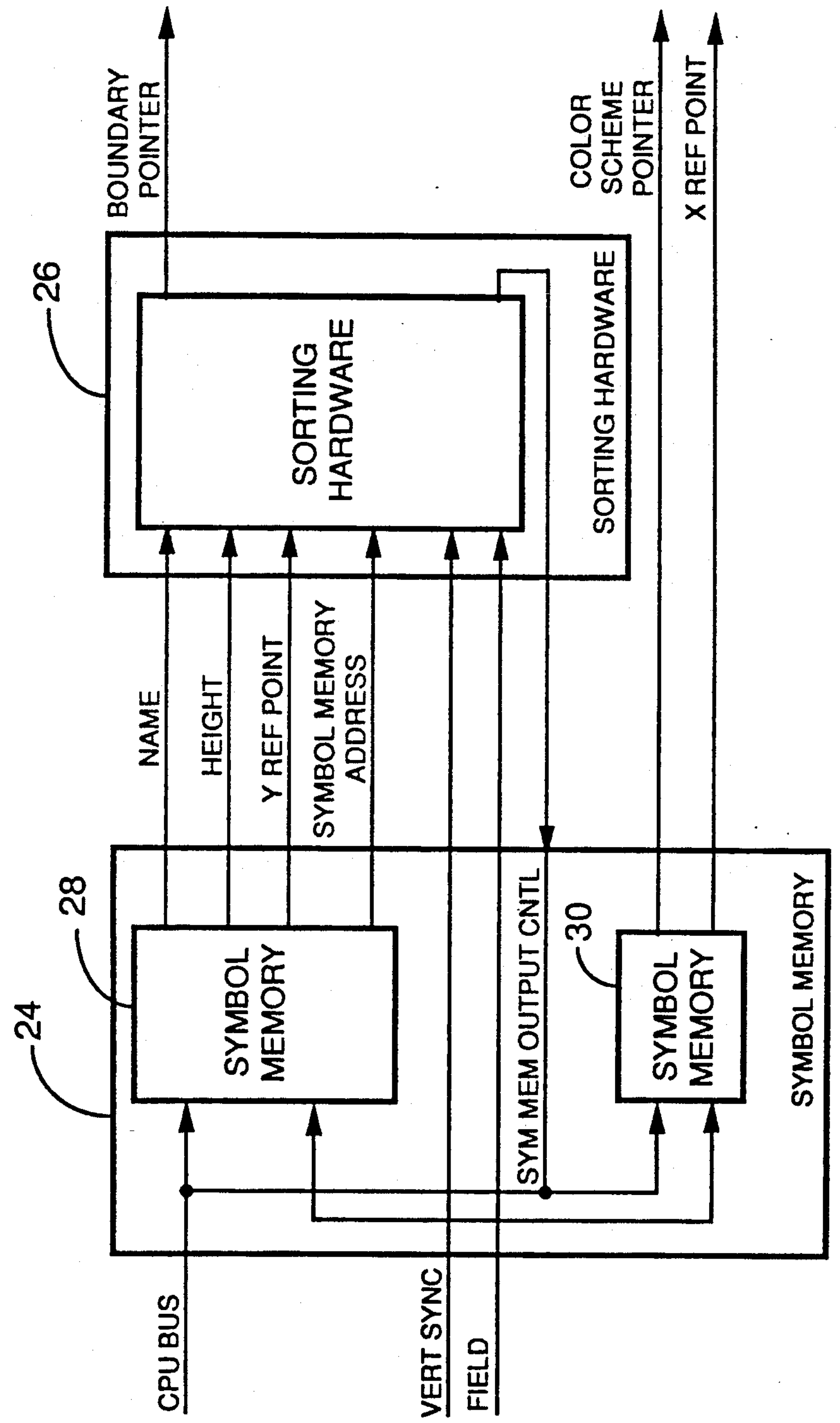
FIG. 3 is a block level diagram of the vertical sorter stage of the symbol generator of FIG. 1.
Figure 4:
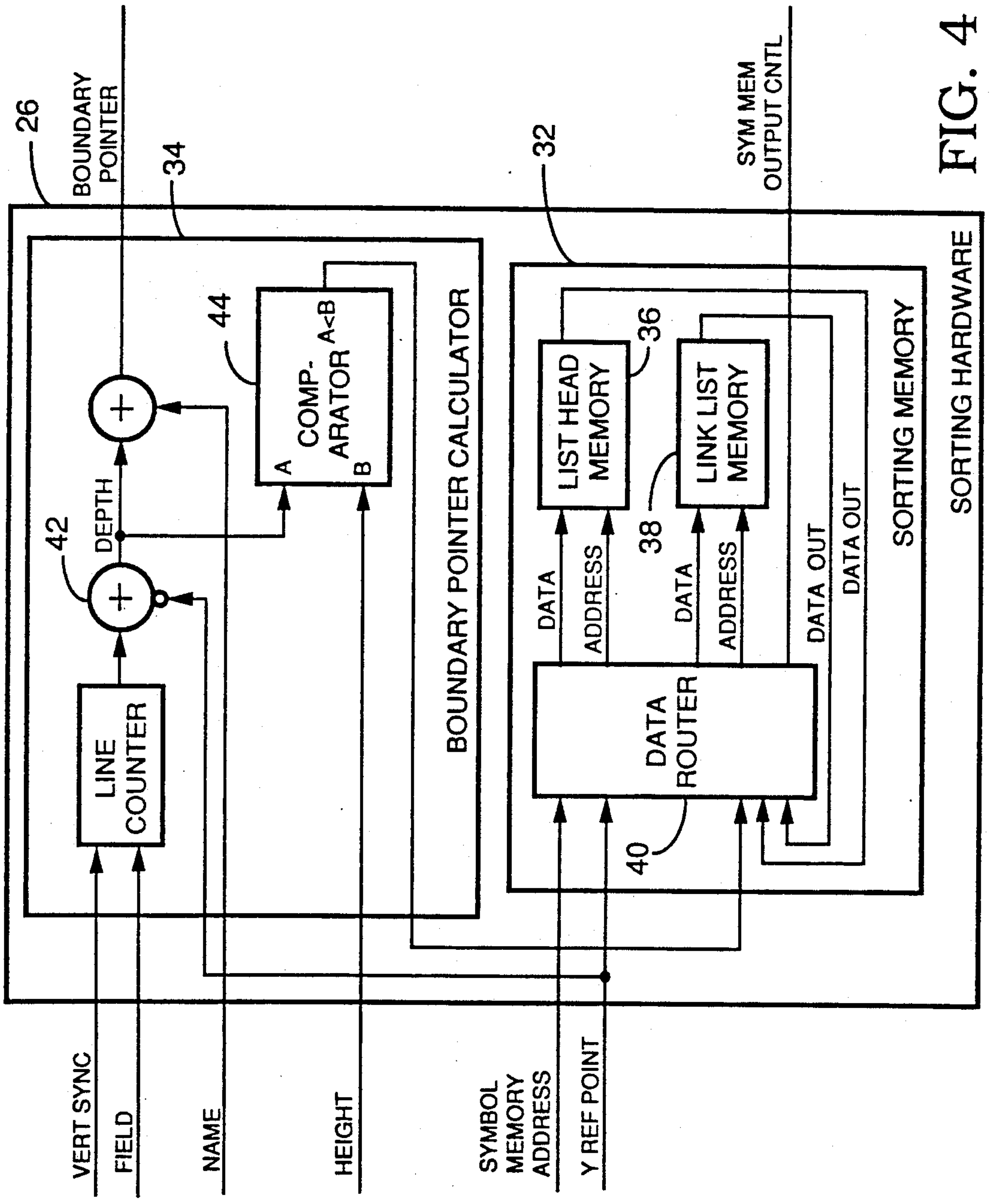
FIG. 4 is a more detailed drawing of the sorting hardware portion of the vertical sorter.

As shown in FIGS. 1, 3 and 4, vertical sorter 14 is comprised of a symbol memory 24 for receiving selected parameters from the cpu 12 and sorting hardware 26 for using those parameters to provide vertical sorting by generating a sequence of memory addresses to locations in the boundary generator 16 for each scan line that cause the boundary generator to output the output parameters for symbols on that scan line. Symbol memory 24 is comprised of two memories or sets of registers 28 and 30. Memory 30 is an extension of memory 28. These memories are shown separately to facilitate description, as they receive different symbol parameters which are transmitted to different locations and used differently in generating a video output signal. Memory 28 receives the name, height and y coordinate of the display reference point for each symbol to be included in a display. Memory 30 receives the color scheme number and x coordinate of the reference point.

The sorting hardware 26 is shown in more detail in FIG. 4. This hardware includes a sorting memory 32 for accessing symbol memory 28 for each symbol included on a scan line and a boundary pointer calculator 34 for using those reference parameters to provide output numbers that point or lead to addresses in the boundary generator that contain symbol parameters for that scan line. The sorting memory 32 is comprised of a list head memory 36, link list memory 38 and data router 40. Router 40 is comprised gating logic for transmitting signals along different selected paths as described below in response to receipt of appropriate control signals. Memories 36 and 38 are interconnected through router 40 to form a linked list or chain of addresses for each scan line of a display to the locations or registers of symbol memory 28 that contain the reference parameters for each symbol included on that scan line.

Figure 5:
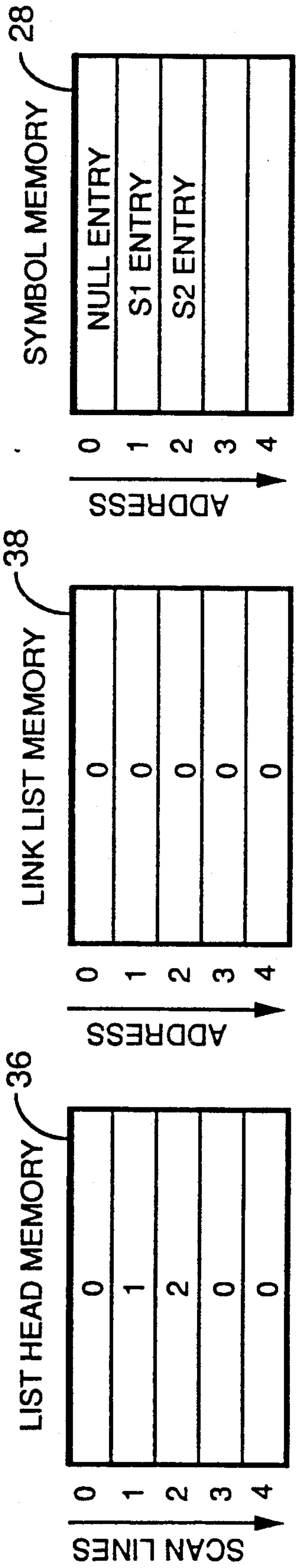
FIG. 5 illustrates the sorting memories of the vertical sorter.

The interconnection or linked list of addresses to memory 28 may be best understood from FIG. 5. Each register of list head memory 36 represents one scan line of a television display. The numbers loaded into the registers of list head memory 36 define addresses of both the link list memory 38 and symbol memory 28. Entries in the link list memory 38 define addresses of both the symbol memory 28 and other addresses of the link list memory 38. As will be apparent hereinafter, this addressing scheme enables the two addressing registers to provide lists or change of addresses to however many symbols may be included on a scan line.

Figure 2:
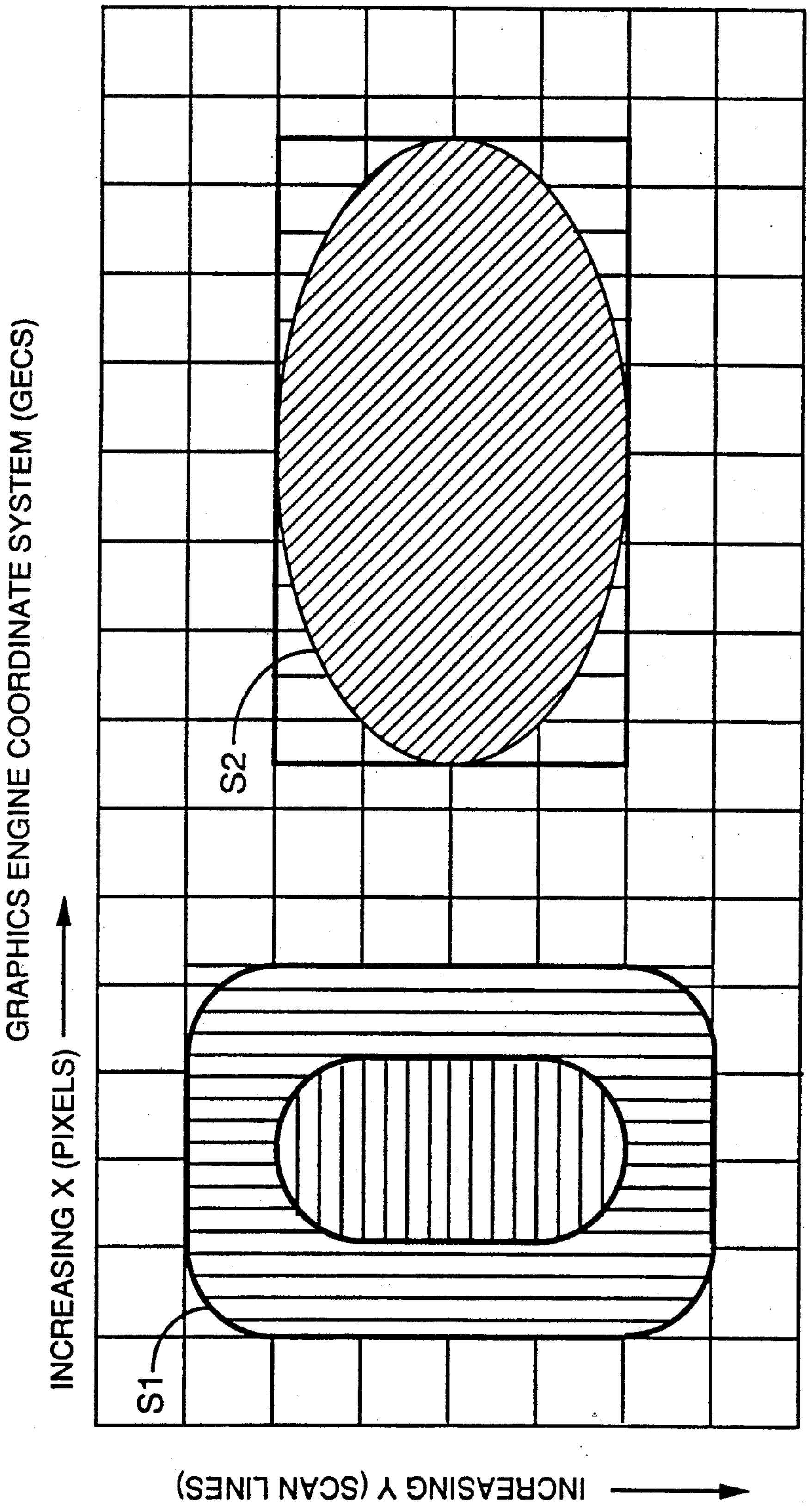
FIG. 2 is an illustration of a television display of two symbols.

FIG. 5 shows the initial entries in the registers of the sorting and symbol memories. Each register of the symbol memory 28 contains reference parameters for one symbol, namely the symbol name, height, and y coordinate of the selected reference location in a desired display. These entries need not be arranged or sorted in any particular order in memory 28. The vertical sorter 14 sorts symbol parameters without changing either the order or value of parameters in symbol memory 28. The register addresses in symbol memory 28 for each symbol are loaded into the register of the list head memory 36 that corresponds to the display scan line of the reference point location for that symbol. FIG. 5 represents the loading or entry for the display shown in FIG. 2. In FIG. 2, the reference point for symbol S1 is on scan line 1 and reference point for symbol S2 is on scan line 2. The addresses of these symbols in symbol memory 28 are therefore loaded into registers 1 and 2 respectively of list memory 36.

The values of the entries in individual registers of the list head memory 36 and link list memory 38 are changed and updated during vertical sorting as follows. Only one address may be included in each individual register of memories 36 and 38. When additional symbols are placed on a line, the address already in the register of memory 36 for that scan line is forwarded to the address in link list memory 38 which is the same as the address in symbol memory 28 of the new entry added to list head memory 36. This forwarding of symbol addresses creates link lists for all symbols on each scan line. Zero entries in the list head memory 36 and link list memory 38 end the linked lists for the different scan lines. If there is a zero entry in a register of list head memory 36 when that register is reached during sorting, no entries will be read from symbol memory 28 for the scan line represented by that register. A zero in the link list memory 38 at the end of a chain of linked addresses ends read out of memory 28 for that scan line.

In operation, the sorting memory 32 provides the name, height, and y coordinate of the reference point for each symbol indicated by the linked list to be on a scan line to the boundary pointer calculator 34. Calculator 34 uses these numbers to provide pointers to memory locations in boundary generator 16. The pointers for each symbol are equal to the depth or distance into the symbol of the line being scanned plus symbol name. Depth is provided by summing element 42 which subtracts the y value or scan line of the symbol reference point from the instant scan line. If the depth is less than the symbol height or total number of scan lines of the symbol, comparator 44 provides an output to data router 40 which directs the router to add the address for that symbol to the linked list for the next line, or forward the entry to the next register of list head memory 36 and forward any prior entry to link list memory 38. For example, symbols S1 and S2 both appear on scan line 2 on FIG. 2. After completion of scan line 1, a 1 would be entered in register 2 of list head memory 36 and the 2 would be forwarded to register 1 of link list memory 38.

Boundary Generator

Figure 6:
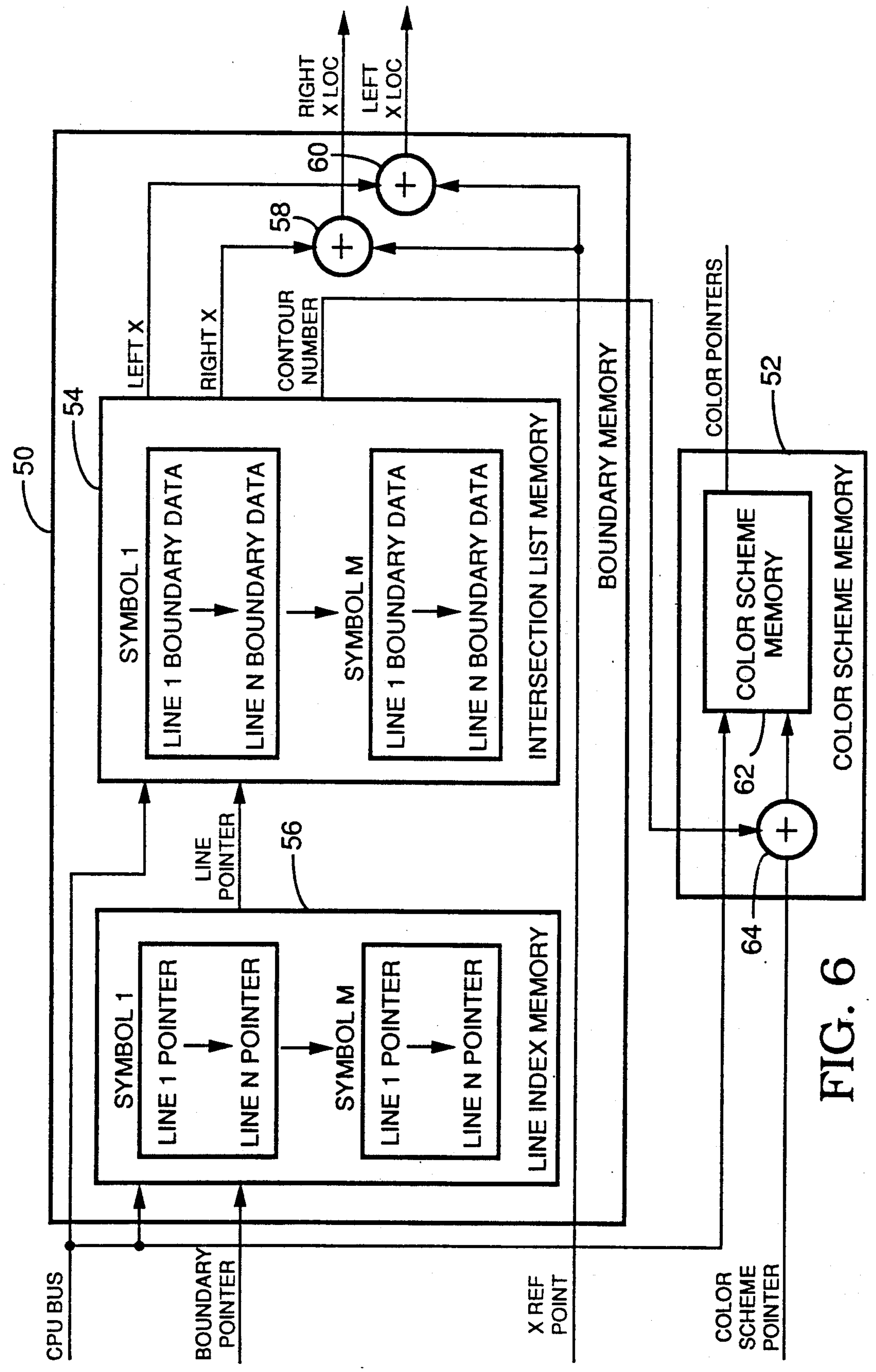
FIG. 6 is a block level diagram of the boundary generator stage of the symbol generator of FIG. 1.
Figure 7:
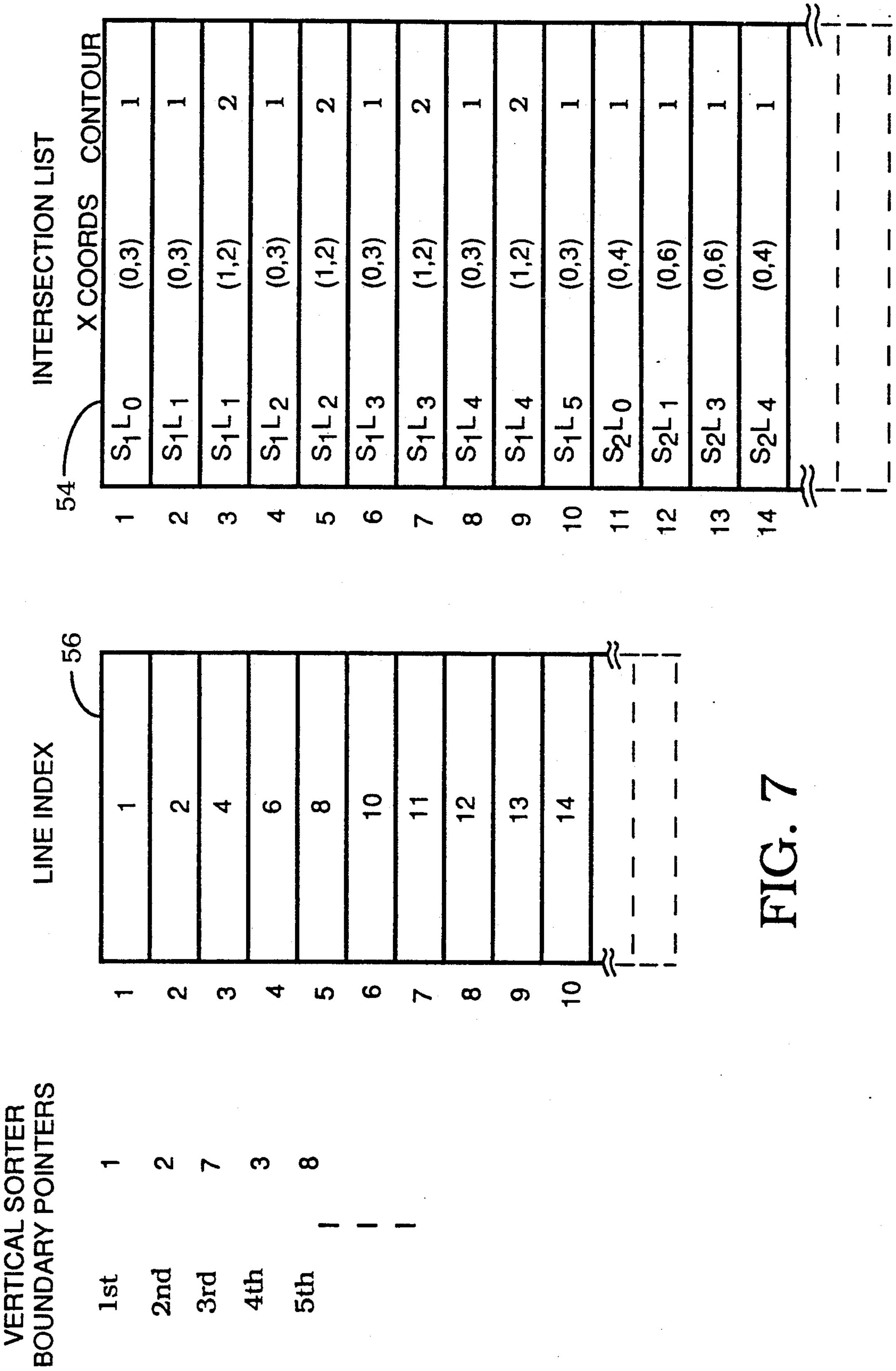
FIG. 7 illustrates data storage structure in the memories of the boundary generator and the addressing sequence to those memories outputted by the vertical sorter.

Boundary generator 16 is comprised of a boundary memory 50 for converting right boundary pairs for each symbol provided by the cpu to left/right coordinates sorted according to vertical position in an intended display, and a color scheme memory circuit 52 for providing color pointers or address numbers that are used as described hereinafter to identify addresses in the color palette 20 containing colors selected for each contour of symbols to be represented by the video output signal. The boundary generator 16 is illustrated by FIGS. 6 and 7. The boundary memory 50 is comprised of an intersection list memory 54 that is loaded by the cpu with the bounding box boundary coordinate pairs and contour numbers for each symbol calculated by the cpu. The parameters for each symbol are sorted by the cpu before they are supplied to the boundary generator and are loaded together in sorted order into consecutive registers or blocks of the intersection list memory 54. Different symbols can be loaded into memory 54 in any order so long as all entries for each symbol are kept together in defined block. The arrangement of the symbols in the intersection list memory need not, and generally will not represent any spatial or other sorting. Boundary parameters for each symbol are loaded into whatever memory sections are available as different symbols are added or deleted from the output signal. The parameters shown in FIG. 7 are for symbols S1 and S2 of FIG. 11. The designations of the symbol and line ($S_xL_x$) shown in FIG. 7 are provided for assistance in understanding the listed numerical values and do not represent data stored in the memory.

Boundary memory 50 also includes a line index memory 56 for storing pointers or addresses to locations in the intersection list memory 54. The cpu, having read the y values of the bounding box coordinates loads one pointer for each line of a symbol into consecutive registers of the line index memory 56. These pointers identify the first address or register of intersection list memory containing boundary values for each line of a symbol. Symbol S1 of FIG. 11 includes six lines and symbol S2 four lines. The first six registers in line index memory 56 contain pointers to the registers containing the first entry for the six lines of symbol S2. Registers 7 through 10 contain the addresses of the first entries for each line of symbol S2 in intersection list memory 54. The cpu 12 also presets a bit in the last entry for each line to control readout. In operation, vertical sorter 14 provides a sequence of addresses in scan line order to locations or registers of line index memory 56 that contain addresses to registers in intersection list memory 54 which contain the first set of parameters for each symbol on a given scan line. The x coordinates transmitted from the intersection list memory 54 are provided to summing elements 58 and 60 which add the x location of the reference point for each symbol to those coordinates to provide the x coordinate of each element in an intended display.

Color scheme memory circuit 52 includes a memory 62 that is pre-loaded by the cpu with numbers determined by the color scheme desired by and operator, and a summing element 64 that adds the contour number for each boundary to the color scheme number for that symbol received from symbol memory 30 of vertical sorter 14. The summed number provided by element 64 is an address number to color scheme memory 62 that determines the value of the output signal from memory 62. The color scheme memory 62 permits an operator to select a more complex color scheme and to change the color of a symbol more easily than if the summation signal provided by adder 64 were used directly to generate addresses to color palette 20 independent of memory 62.

Horizontal Sorter

Figure 8:
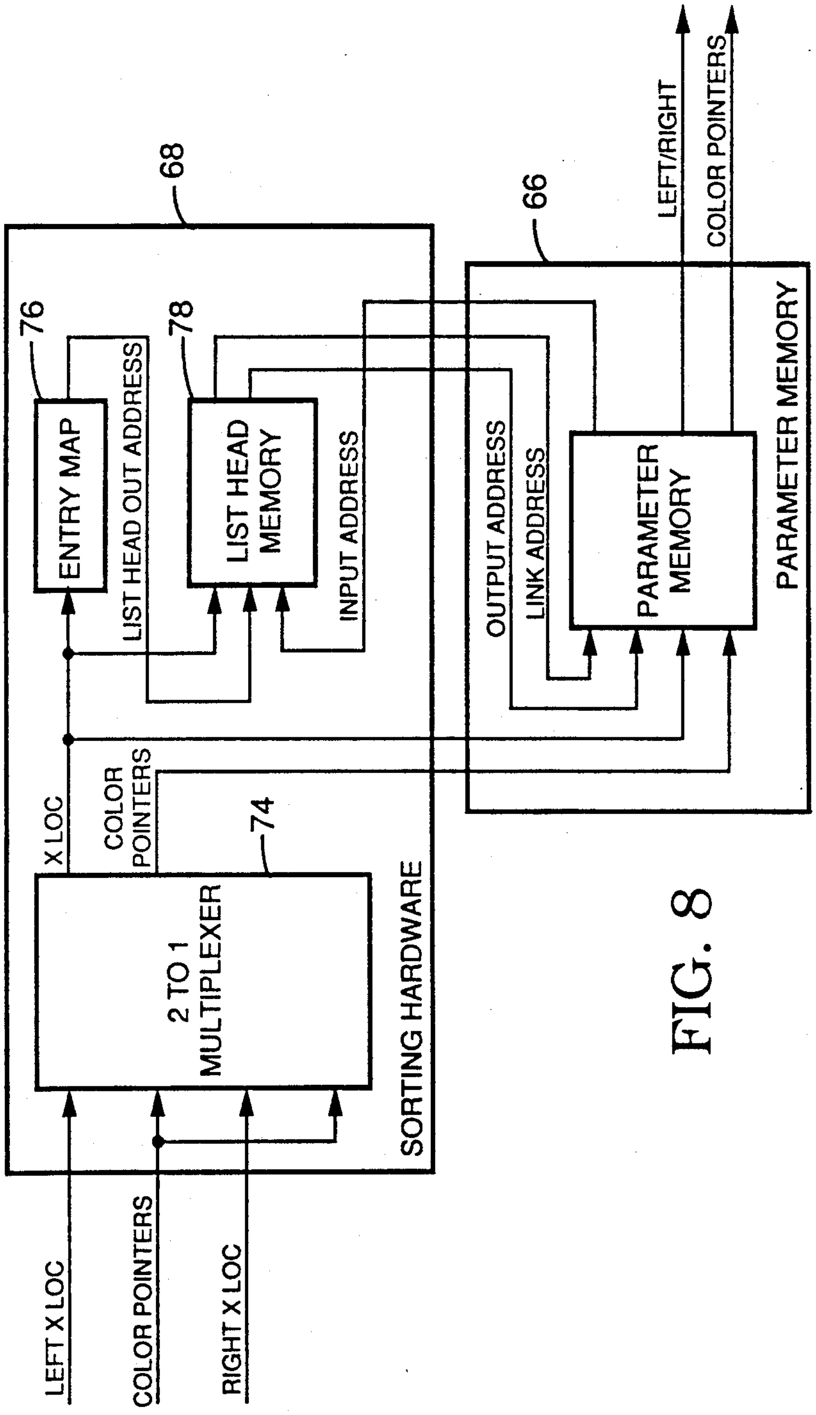
FIG. 8 is a schematic diagram of the coordinate sorting structure of the horizontal sorter stage of the symbol boundary generator.
Figure 9:
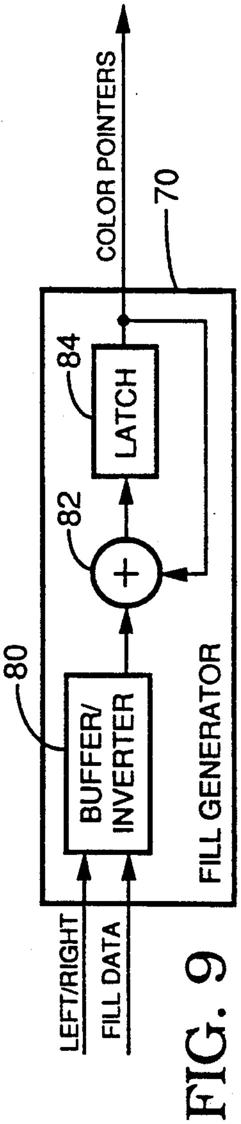
FIG. 9 is a schematic diagram of the fill generator element of the horizontal sorter.

As is shown in FIGS. 1, 8 and 9, the horizontal sorter 18 is comprised of a parameter memory 66 and sorting hardware 68 for sorting color pointer numbers according to position along each scan line or x axis value, a fill generator 70 for increasing the value of the color pointer at left boundaries and decreasing the value at right boundaries, and a boundary buffer 72 that stores the coordinate values provided by parameter memory 66 and the color pointers provided by fill generator 70 for each field for delay and presentation in the next field. This one field delay permits time averaging so that the generator can generate signals representing images that include more boundaries on some scan lines than can be processed in a television horizontal line interval.

FIG. 8 shows the parameter memory 66 and sorting hardware 68 in more detail. The sorting hardware includes a multiplexer 74 that receives left and right boundary coordinates from the boundary generator 16 and provides them to parameter memory 66, entry map memory 76 and list head memory 78. The left/right designation of boundaries recorded in parameter memory 66 is maintained by loading right boundaries into even registers and left boundaries into odd. Memory 76 and 78 each include one memory location for each display location or pixel of a scan line of a video display raster. Memory 76 is a bit memory. Each bit represents a corresponding address register in list head memory 78. For each color pointer loaded into parameter memory 66, a bit is set in map 76 that corresponds to the x location of that color pointer along a scan line, and the location or register number of memory 66 that receives the color pointer is recorded in the location or register of memory 78 that corresponds to the bit that was set in memory 76.

The loading of signals into appropriate locations of memory 76 and 78 is accomplished by providing the x coordinate locations of the boundary points for all color pointers loaded into parameter memory 66 as addressing signals to entry map 76 and list head memory 78. The location or register of memory 66 containing the color pointer for that boundary point is provided to memory 78 along the link address channel illustrated in FIG. 8 as a data signal that is recorded at the list head address specified by the addressing signal or x coordinate of the boundary point. A rapid readout of parameters in scan line order is provided by scanning entry map 76. Each preset bit indexes the corresponding memory location in list head memory 78 which addresses the appropriate color scheme number in parameter memory 66.

The fill generator 70 included in horizontal sorter 18 is shown in more detail in FIG. 9. Generator 70 is comprised of a buffer inverter 80, adder 82 and latch 84. The fill generator receives color pointers from parameter memories 66 and a bit that indicates whether the color number is for a left or right boundary. The inverter 80 inverts right boundaries. Latch 84 retains the output color pointer or address signal provided by the fill generator 70. Adder 82 applies color pointer numbers for left boundary points to increase the output signal provided by fill generator 70 and thus increase the register address of color palette 20 that is accessed at a left boundary point. Since color address numbers for right boundaries are inverted, each color pointer for a right boundary point reduces the output number provided by fill generator 70. When a right boundary point is reached the register address of palette 20 that is accessed is thus reduced. The summed output signals provided by fill generator 70 are transmitted to boundary buffer 72 which also receives the display coordinates associated with those address signals from parameter memory 66. The coordinate locations of the address signals represent the locations of boundary points both on a raster display and also in the video signal to be provided by the symbol generator 10. Zero values of the summed color pointer or address signal provided by fill generator 70 are data points and are provided to boundary buffer 72 the same as other signal values. Zeros represent the address in color palette 20 of the background color.

Boundary buffer 72 is a first-in first-out memory that retains signal values for one field, or in other words retains all values generated for a field before transmitting the summed pointer signals received from fill generator 70 as address signals to color palette 20. The coordinate locations of the summed address signal for boundary points associated with those address signals control the timing or readout of the address signals from buffer 72 to color palette 20. Buffer 72 begins transmission of each summed address signal upon receipt of a control count equal to the coordinate location of the boundary point for that address signal and maintains the address as an output signal until the control count reaches the address of the next boundary. In the symbol generator 10, the control count is provided by a pixel counter (not shown) included in color palette 20. The counter is responsive to external control signals for the overall video system, i.e. the pixel clock, horizontal sync and vertical sync signals that are generated external of the symbol generator 10 to control operation of an overall video system including the generator 10 and all other devices such as a video display used in combination with generator 10. The control counter in color palette 20 includes a pixel counter that is clocked by (reads) the external pixel clock and is reset by the horizontal sync signal, and a line counter that is clocked by the horizontal sync signal and reset by vertical sync.

The color palette 20 is a look up table that is preloaded from the cpu according to the colors that an operator desires to generate. A typical palette includes a number of different locations. Each location contains four sets of eight bit registers, one each for red, green, blue, and a key signal. Values loaded into these individual registers determine the color provided when that location is accessed by an address signal from boundary buffer 72.

Overall System Operation

Figure 13:
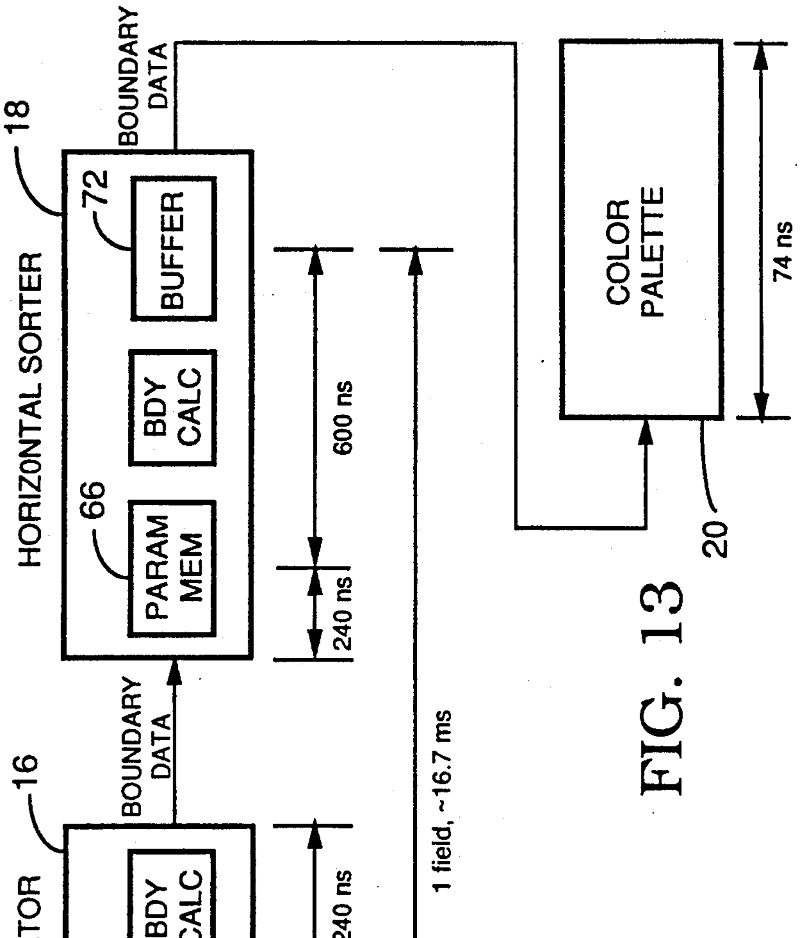
FIG. 13 is a timing diagram that shows the time required for each stage of a specific embodiment of the boundary generator 10 to produce a video signal representing one field.

FIG. 13 illustrates the time required for operation of each of the pipeline stages discussed above and performance of each processing step for one video field in one preferred embodiment of the system 10. In the embodiment as illustrated in FIG. 13, symbol memory 24 of vertical sorter 14 is a 2K or two thousand word double port memory that permits simultaneous read and write operations. In boundary generator 16, intersection list memory 54 and line index memory 56 are both 1 Meg memories, and color scheme memory 62 is an 8K memory. In horizontal sorter 18, parameter memory 66 is a 2K double buffered memory, and boundary buffer 72 is a 64K double buffered memory. The vertical sorter 14 sorts boundary points according to position in a display in 16.7 ms. In the boundary generator 16, readout of addresses to intersection list memory 54 from line index memory 56 is performed in 240 ns. Readout from the intersection list memory 54 occurs in additional 240 ns. The boundary calculations, which include determination of display coordinates by adding the reference point location for each symbol to the bounding box coordinates, and readout of an appropriate color scheme number from color scheme memory 62 occurs in 240 ns. In the horizontal sorter 18, symbols are read into appropriate locations in parameter 66 in 240 ns. Address numbers are established in entry map memory 76 and list head memory 78, and parameters read out to boundary buffer 72 in appropriate sorted order in 600 ns. Color palette 20 receives readout address commands and provides/changes the RGB video data signal in 74 ns.

Having this described embodiment of this invention, a number of modifications will be readily apparent to those skilled in the art. The functions performed by the specific devices described herein can be other elements. For example, functions performed by software could be provided by hardware elements, and hardware functions can be performed by software. Also, the scheme of this invention can be implemented in a black and white television embodiment. The term video color signal has been used in a broad sense to refer to the video data signal and includes both chrominance and luminance components.

What is claimed is:

1. A symbol generator for providing a video data signal representing selected symbols comprising:

means for providing first signals sorted according to positions of symbol boundaries in the video data signal and identified as representing left and right boundaries;

means responsive to said first signals for providing a summed address signal that applies said first signals representing right boundaries to decrease a magnitude of said summed address signal and that applies said first signals representing left boundaries to increase the magnitude of said summed address signal; and means responsive to said summed address signal for providing a video data signal having a value determined by the value of said summed address signal.

2. The symbol generator of claim 1 in which:

said means for providing said first signals includes:

a series of processing stages for determining coordinates of boundary points in a video display represented by the video data signal; and said series of processing stages includes:

means for sorting said first signals for all boundary points for each video display field and means for maintaining a left/right identification of boundary points represented by said sorted signals.

3. The symbol generator of claim 2 in which said series of processing stages include a stage for sorting signals according to vertical position in a video display that sorts signals representing left and right boundary points along a common boundary line as left/right boundary pairs.

4. The symbol generator of claim 2 in which said series of processing stages includes a stage for sorting signals according to horizontal position in a video display having:

a first memory for storing said first signals:

a second memory for storing register locations in second memory locations, the stored register locations being the locations where said first signals are stored in said first memory and the stored register locations representing locations along a horizontal scan line across the video display; and a third memory having individual bits corresponding to memory locations in said second memory such that scanning of said third memory indexes said second memory which in turn addresses said first memory to provide a rapid horizontally sorted read out of said first signals in said first memory.

5. The symbol generator of claim 1 in which said means for providing said summed address signal comprises:

means for adding values of received first signals for left boundaries to said summed address signals; and means for inverting the values of first signals for right boundaries and providing said inverted values to said adding means.

6. The symbol generator of claim 5 in which:

said means for providing said summed address signal includes:

means for retaining a last provided summed address signal; and said means for adding values of first signals to said summed address signal comprises:

summing means for updating said summed address signal by adding first signals to the last provided summed address signal provided by said retaining means.

7. The symbol generator of claim 1 in which:

said means for providing a video data signal comprises:

a color look up palette for providing a video data signal having a color value determined by a value of said summed address signal; and in which:

said means for providing a summed address signal comprises:

a fill generator means for providing a summed color address signal to said color look up palette.

8. The symbol generator of claim 1 further including:

a boundary buffer memory for storing coordinate locations of boundary points of a symbol and values of said summed address signal for said boundary points.

9. A symbol generator for providing a video data signal representing selected symbols for a video display comprising:

means for generating address signals for boundaries of selected symbols which address signals identify addresses in a look up memory means;

means responsive to said generated address signals for sorting said address signals for said boundaries, the sorting means including:

a first memory for storing said address signals for said boundaries in locations of said first memory, a second memory having memory locations corresponding to locations of the video display for storing the first memory locations of said address signals in second memory locations, the second memory locations corresponding to boundaries of the video display, the boundaries being represented by said address signals, and the stored register locations being the locations where said first signals are stored in said first memory and the stored register locations and a third memory having individual bits corresponding to locations in said second memory such that scanning of said third memory indexes said second memory which in turn addresses said first memory to provide rapid sorted readout of said address signals; and said look up memory means responsive to said sorted readout of said address signals for providing a video data signal having a value determined by values of said sorted address signals provided to said look up memory means.

10. The symbol generator of claim 9 in which:

said second memory includes a separate memory location for each display location along one horizontal scan line of said video display; and said sorting means include means for vertically sorting said address signals according to position in said video display and providing said vertically sorted address signals for boundary points along consecutive horizontal scan lines across the video display in sequence to said first memory.

11. The symbol generator of claim 10 further including means for providing x coordinates of said boundaries in said video display to said second and third memories as address signals.

12. A symbol generator for providing a video data signal representing selected symbols for a video display comprising:

means (a) for providing address signals which address signals identify preselected addresses in a look up memory and which address signals are for identifying boundaries of selected symbols and (b) for providing coordinate locations which coordinate locations identify positions of boundary points in said video display and (c) for sorting said address signals and said coordinate locations according to the positions of said boundary points in said video display;

memory means (a) for storing said sorted address signals and said sorted coordinate locations for a video field and (b) for supplying said sorted address signals and said sorted coordinate locations to said look up memory means to control a value of a video data signal; and said look up memory means responsive to said sorted signals and to said sorted coordinate locations for providing said video data signal with a value determined by values of said sorted signals and said sorted coordinate locations as provided to said look up memory means.

13. The symbol generator of claim 12 in which:

said memory means for storing said address signals and said coordinates locations includes means for maintaining the address signal for each boundary as an output signal to said look up memory means until receipt of a control signal corresponding to the coordinate locations of a next boundary, the control signal being provided by a control signal providing means.

14. The symbol generator of claim 13 further comprising a series of processing stages in which:

a first stage includes said look up memory means;

a second stage includes said means for providing said address signals and said coordinate locations a third stage includes means for sorting said coordinate locations and said address signals for all points of all symbol boundaries according to position in said video display for each display field;

said third stage also including said memory means for storing and supplying said coordinate locations and addresses signals, wherein said storing and supplying memory means comprises a first-in first-out boundary buffer memory for providing output address signals for one video display field while simultaneously receiving signals for a subsequent display field;

said second stage being coupled to said third stage; and said third stage being coupled to said first stage.

* * * * *